Dec. 28, 1943.  J. P. LA VIGNE  2,338,001
MICROMETER
Filed Jan. 19, 1942  2 Sheets-Sheet 1
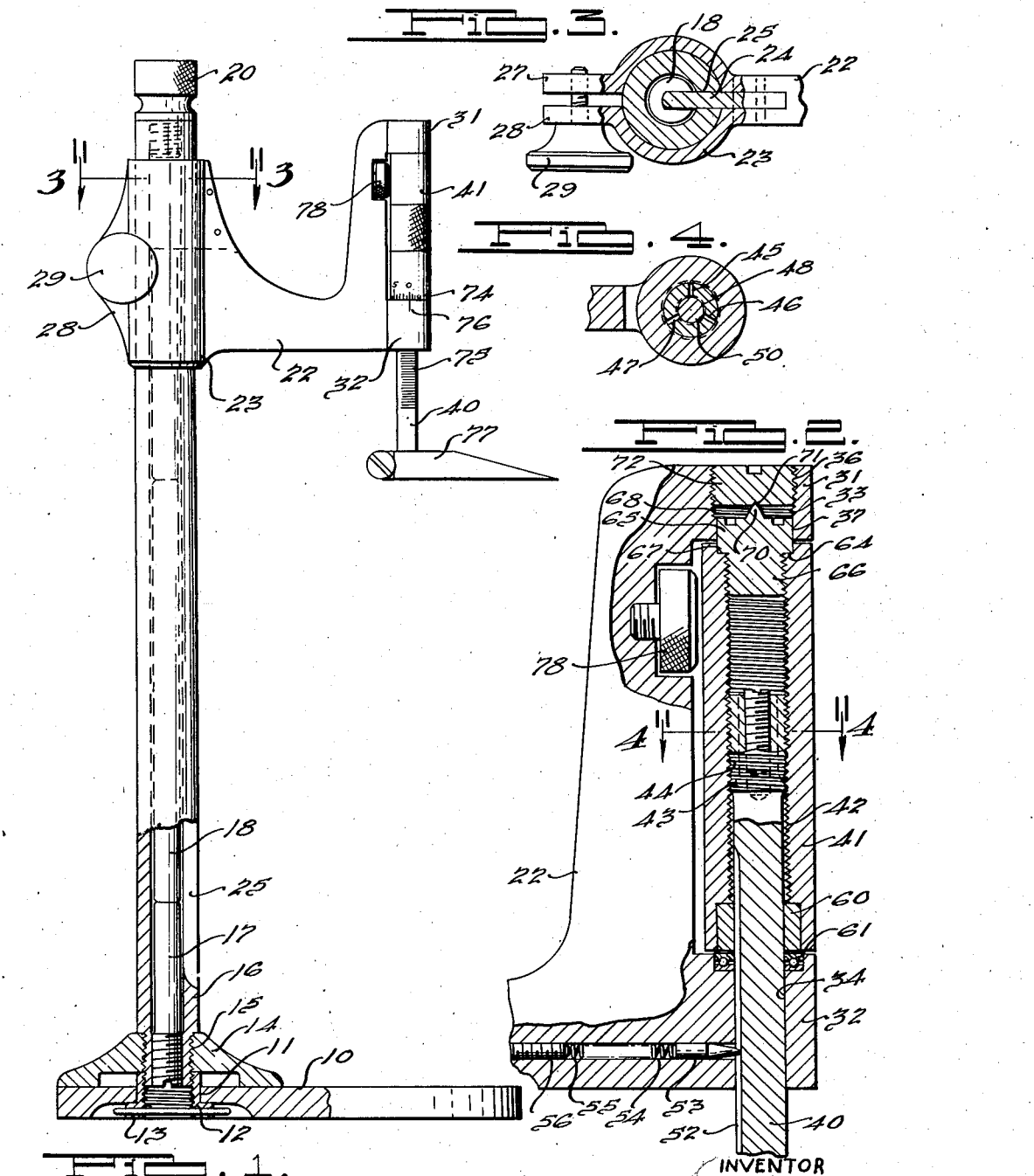
INVENTOR
JOSEPH P. LAVIGNE, DECEASED.
OLIVE M. LAVIGNE,
ADMINISTRATRIX.
BY
Harness, Dickey & Pierce.
ATTORNEYS.

Dec. 28, 1943.  J. P. LA VIGNE  2,338,001

MICROMETER

Filed Jan. 19, 1942  2 Sheets-Sheet 2

INVENTOR
JOSEPH P. LAVIGNE, DECEASED,
OLIVE M. LAVIGNE,
ADMINISTRATRIX.

BY

ATTORNEYS.

Patented Dec. 28, 1943

2,338,001

UNITED STATES PATENT OFFICE 2,338,001

MICROMETER

Joseph P. La Vigne, deceased, late of Detroit, Mich., by Olive M. La Vigne, administratrix, Detroit, Mich.

Application January 19, 1942, Serial No. 427,238

6 Claims. (Cl. 33—170)

The invention relates to measuring instruments and it has particular relation to a micrometer gauge.

One object of the invention is to provide a micrometer gauge or measuring instrument which is so constructed that greater precision may be obtained in making measurements, all to the end that greater precision may be effected in manufacturing industries where accuracy is desirable.

Another object of the invention is to provide a micrometer of improved character and greater accuracy wherein the spindle for engaging the part to be measured is reciprocatory to and from the part but is not rotatable.

Another object of the invention is to provide improved means for adjusting the micrometer and compensating for play and wear.

Another object of the invention is to provide improved thrust bearing means between the ends of a rotatable sleeve forming a part of the micrometer and arms forming a part of the micrometer frame.

Other objects of the invention will become apparent from the following specification, from the drawings relating thereto, and from the claims hereinafter set forth.

For a better understanding of the invention, reference may be had to the drawings, wherein:

Figure 1 is an elevational view partly broken away, of a micrometer having a scriber attached thereto, constructed according to one form of the invention;

Fig. 2 is a vertical cross-sectional view of the micrometer part of the instrument shown by Fig. 1;

Fig. 3 is a cross-sectional view taken substantially along the line 3—3 of Fig. 1;

Fig. 4 is a cross-sectional view taken substantially along the line 4—4 of Fig. 2;

Figure 5:
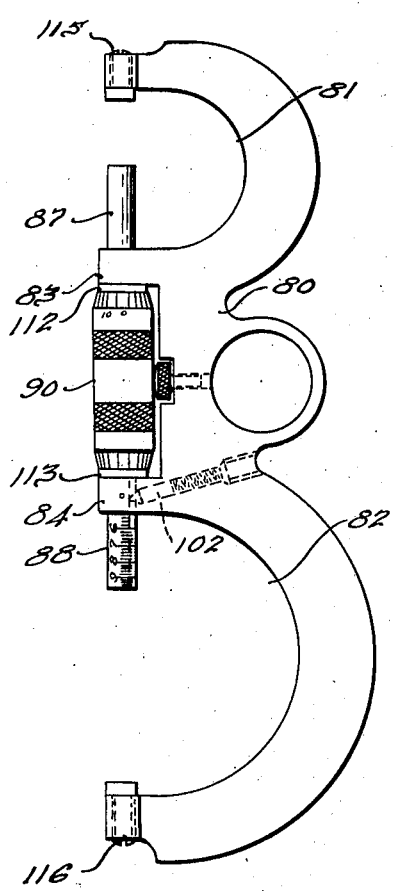
Fig. 5 is a view illustrating a micrometer gauge constructed according to another form of the invention.

Referring to Fig. 1, the instrument shown includes a base 10, which is apertured as indicated at 11 for receiving an internally threaded bushing 12 having a flange 13 adapted to engage the surface of a recessed lower side of the base. Above the base, a supporting element 14 is provided which has a threaded opening 15 into which a tubular column 16 is threaded. The lower end of this column is also threaded into the bushing 12 and from this it follows that the column may be rigidly fastened to the base 10. A lower plug 17 has a lower threaded end adjustably threaded into the lower end of the column and above this column one or more additional plugs 18 may be inserted from the upper end of the column. A threaded plug 20 normally closes the upper end of the column.

A micrometer frame or support 22 has a tubular portion 23 receiving the column 16, and a leg 24 on the frame as best shown by Fig. 3, projects through a slot 25 in the column and rests on the upper of the plugs. In this way the micrometer frame is supported on the plug and it will be apparent from the structure described that the position of the micrometer frame may be varied vertically by changing the number or size of plugs and adjusting the position of the lower plug 17. For firmly fastening the micrometer frame on the column, the tubular portion 23 is in bifurcated form and has legs 27 and 28 which may be adjustably drawn together by a thumb screw 29 so as to clamp the tubular portion 23 about the column.

The micrometer frame 22, as best shown by Fig. 2, has upper and lower arms 31 and 32 which are apertured as indicated at 33 and 34, respectively. The aperture 33 has its upper portion threaded as indicated at 36 while its lower part is smooth as indicated at 37. A spindle 40 is slidably mounted in the aperture 34 in the lower arm 32 and projects upwardly into a rotatable sleeve 41 disposed between the arms 31 and 32. This sleeve is internally threaded as indicated at 42 and the upper end portions of the spindle is slightly enlarged as indicated at 43 and is externally threaded as indicated at 44 for engagement with the threads 42.

For adjusting the threaded engagement, the portion 43 of the spindle is axially slotted at three points as indicated at 45, 46, and 47, Fig. 4, and this portion of the spindle is provided with an internally threaded aperture 48. A tapered screw 50 is threaded into the upper end of the aperture 48 and the dimensions of the screw and aperture are such that the segments formed by the slots may be expanded into closer threaded engagement with the threads of the sleeve. In this way undesirable looseness or play in the threaded engagement may be avoided while still permitting rotary movement of the sleeve with respect to the spindle.

The spindle fits closely but slidably in the opening 34 so as to be guided thereby and for preventing rotation of the spindle, it is provided with a keyway 52 which is engaged by a pin 53 movable in an opening 54 in the micrometer frame. A spring 55 normally urges the pin 53 into engagement with the groove 52 and a screw 56 holds the spring in position. The opening 54 extends laterally through the web of the frame and also through the tubular portion 23 so that access to the screw 56 may be obtained when the micrometer frame is removed from the column.

At the lower end of the sleeve 41, a thrust bearing bushing 60 is press fitted in the end of the sleeve and this is adapted to rest on a ball thrust bearing 61 provided in the upper side of the arm 32. The bushing 60 has a close fit with the spindle 40, but it is to be understood that the bushing and sleeve can freely rotate relative to the spindle and that the spindle can reciprocate freely in the bushing.

At its upper end, the sleeve is recessed so as to provide a shoulder 64, and a plug 65 has a reduced portion 66 threaded into the sleeve so as to rotate with the latter and an enlarged portion 67 adapted to engage the shoulder 64 and to fit the recess. The enlarged portion of the plug projects upwardly into the cylindrical or smooth part 37 of the opening 31 in the upper arm, and a slightly loose fit is desirable between the portion 65 and the part 37 of the opening so that there will be no interference with centering of the plug, as will be presently mentioned. The upper side of the plug may have spanner wrench openings so that it may be inserted and removed from the upper end of the opening 31.

For providing a precision and non-varying thrust bearing at the upper end of the sleeve, the plug 65 has a cone shaped projection 70 located at its center and the apex of this projection seats in a small recess 71 formed centrally of the lower face of a plug 72 threaded into the upper portion 36 of the opening 31.

The lower end of the sleeve may be provided with suitable micrometer indicia indicated at 74 in Fig. 1 and the spindle and micrometer frame may be suitably marked as indicated at 75 and 76 so that micrometer measurements may be made, all of which will be understood by those skilled in the art. At its lower end, the spindle 40 may have a scriber 77 attached thereto so that lines may be scribed or measurements taken in use of the instrument. A knurled thumb screw 78 may be provided at the side of the sleeve 41 so that when it is desired to hold the sleeve in any fixed position, loosening of the screw will bring the head into engagement with the sleeve, so as to hold the latter against turning.

From the foregoing description, it should be apparent that undesirable play or looseness in the threaded engagement between the spindle and sleeve can be eliminated entirely while still permitting free and easy movement of the sleeve and spindle relatively. Hence, any inaccuracies which might otherwise be occasioned by thread wear or thread looseness can be overcome with a great degree of precision.

With respect to the substantially point bearing at the upper end of the sleeve, it may be observed first that normally the plug 72 will not be so tightened as to effect a thrust bearing engagement at the points and also at the same time between the bushing 60 and ball bearing 61 or, in other words, slight clearance as exaggerated in Fig. 2 will be present between the bushing 60 and bearing 61 when the points 70—71 are in contact. When the micrometer is used, the position of the scriber arm is normally obtained by movement of the spindle 40 downwardly and due to sufficient resistance to movement of the spindle caused by the pin 53 or by some friction in opening 34, or both, the sleeve 41, when turned to move the spindle, will first back up or move upwardly the slight distance necessary to cause the points 70—71 to contact if they are not already in contact. When this occurs, the spindle advances downwardly and, since the point contacts are so small, no variation will occur by reason of relative turning of the plugs 66 and 72. If large area contact were present between the plugs, as for instance contacts commensurate with the lower face of the plug 72, it will be seen that considerable error might be present during rotation of the plugs relatively for the reason that it would be most difficult, if not impossible, to have large thrust bearing surfaces so fitting and true that some, even though very slight, axial movement of the sleeve would not occur as it was turned. When measuring in ten thousandths of an inch, this variation might easily destroy precision. With the point bearing contact, however, relative turning of the plugs will not effect even slight movement of the sleeve as it is turned and real precision may be obtained.

Reverse movement of the sleeve will move the bushing against the ball bearing but such back up movement is normally not used for measuring. Final positioning or measuring is normally obtained by advancing the spindle downwardly with the points 70—71 in contact and with the bushing 60 and ball bearing 61 out of contact. Any clearance between the bushing and ball bearing will be slight and preferably the point 70 will not completely be out of the point recess 71 when the bushing and ball bearing are in contact. If, however, the point 70 did leave the recess, reverse movement of the sleeve would bring the points together, since the plug 65 would be guided in the recess 37 well enough for this purpose.

Additionally, the substantially point bearing contact avoids undesirable friction and serves as a means for accurately centering the sleeve.

Figure 6:
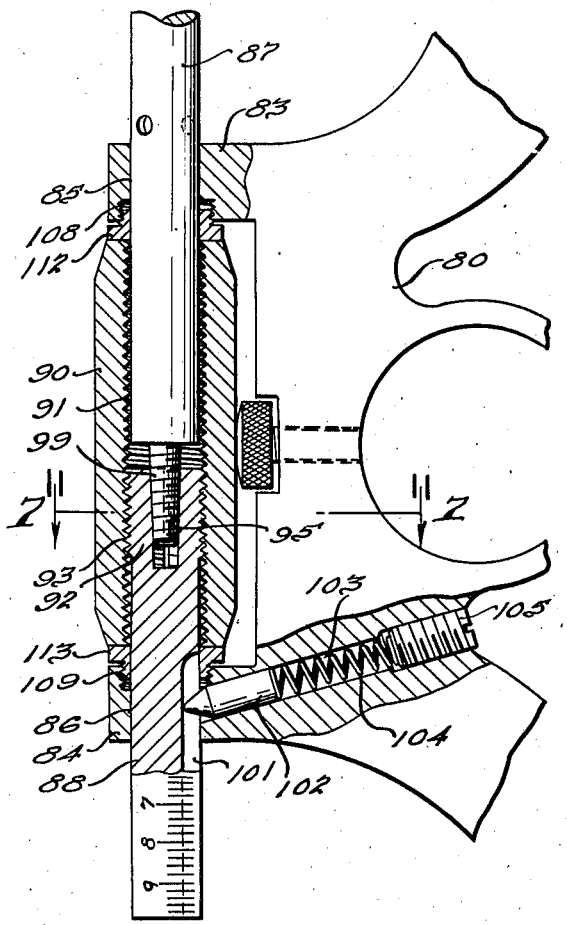
Fig. 6 is a vertical cross-sectional view of the measuring part of the gauge shown by Fig. 5.
Figure 7:
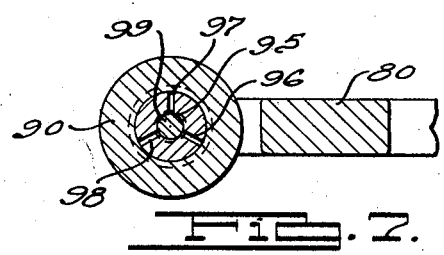
Fig. 7 is a cross-sectional view taken substantially along the line 7—7 of Fig. 6.

Referring to Figs. 5, 6 and 7, the micrometer shown in these figures is of the double type and comprises a frame 80 having a smaller micrometer gap 81 and a larger gap 82. The general idea of this type of micrometer is embodied in the early Patent No. 488,281 of Joseph P. Lavigne and reference to its particular application need not be considered here. The frame also includes arms 83 and 84 which have aligned apertures 85 and 86, respectively. An upper spindle element 87 substantially fits and is freely slidable in the aperture 85 while a lower spindle 88 similarly fits and is slidable in the opening 86. These spindles project into a sleeve 90 disposed between the arms 83 and 84 and this sleeve is internally threaded as indicated at 91. The upper end of the spindle 88 has an enlarged portion 92 provided with threads 93 engaging the threads 91 of the sleeve and this enlarged portion has a central, threaded opening 95 and circumferentially separated slots 96, 97, and 98. At its lower end, the spindle 87 has a tapered stub 99 which is externally threaded and this stub is threaded into the opening 95. From this it will be apparent that if the spindles are turned relatively so as to thread the stub into the opening, the segments between the slots in the threaded end of the spindle 88 may be adjusted outwardly so as to take up any play or looseness in the threaded engagement between the spindle and sleeve. The spindle 88 is normally prevented from turning by means of a keyway 101 which is engaged by a pin 102 slidable in an opening 103 in the frame. A spring 104 presses against the pin 102 and a screw 105 holds the spring in place.

Adjacent ends of the apertures 85 and 86 in the arms 83 and 84 are enlarged and threaded as indicated at 108 and 109 and these threaded portions receive adjustable bushings 112 and 113 which, in turn, bear against the ends of the sleeve, respectively, so as to provide adjustable thrust bearings. It will be apparent that the position of the sleeve may be varied between the arms by changing the positions of the bushings and likewise that any play or looseness may be eliminated by relatively adjusting the bushings. It will be understood, of course, that the sleeve should be freely rotatable so that the spindles may be reciprocated easily. Opposite ends of the frame may be provided with adjustable, threaded heads 115 and 116. During adjustment of the micrometer, it may be found desirable to have these heads adjustable although normally these will have fixed positions.

From this description, it will be apparent that play between the sleeve and spindle threads may be substantially eliminated while still permitting relative and free turning of the sleeve with respect to the spindles, and the errors which might otherwise be occasioned by looseness in the threaded engagement can thus be avoided. Furthermore, the threaded bushings at the ends of the sleeve permit adjustment of the latter and also enable elimination of unnecessary looseness or play at the ends of the sleeve. These factors necessarily contribute to greater precision in the use of the micrometer.

Although more than one form of the invention has been described and illustrated in detail, it will be apparent to those skilled in the art that various modifications may be made without departing from the scope of the appended claims.

What is claimed is:

1. A micrometer gauge comprising a frame element having spaced arms provided with aligned openings, an internally threaded rotatable sleeve between the arms, a spindle projecting through the opening in one arm and into the sleeve and having an externally threaded portion engaging the internal threads of the sleeve, means for adjusting the engagement between the threads so as to compensate for wear or looseness, means for preventing rotation of the spindle while allowing its axial movement, and thrust bearing means between the ends of the sleeve and the arms and including a substantially point bearing contact at one end of the sleeve.

2. A micrometer gauge comprising a frame element having spaced arms provided with aligned openings, an internally threaded rotatable sleeve between the arms, a spindle projecting through the opening in one arm and into the sleeve and having an externally threaded portion engaging the internal threads of the sleeve, means for adjusting the engagement between the threads so as to compensate for wear or looseness, means for preventing rotation of the spindle while allowing its axial movement, and thrust bearing means between the ends of the sleeve and the arms and including elements relatively adjustable longitudinally of the spindle axis and having substantially point bearing contact.

3. A micrometer gauge comprising a frame element having spaced arms, one of which is apertured, an internally threaded, rotatable sleeve between the arms, a spindle slidably projecting through the aperture and into the adjacent end of the sleeve and having an externally threaded portion engaging the internal threads of the sleeve, thrust bearing means between the ends of the sleeve and the arms and including an element having substantially point bearing contact with that end of the sleeve opposite the end from which the spindle projects.

4. A micrometer gauge comprising a frame element having spaced arms provided with aligned openings, an internally threaded rotatable sleeve between the arms, a spindle projecting through the opening in one arm and into the sleeve and having an externally threaded portion engaging the threads of the sleeve, means for preventing rotation of the spindle but allowing its axial movement in the arm opening, and thrust bearing means between the ends of the sleeve and the arms and including elements threaded, respectively, into the end of the sleeve opposite the projecting spindle and into the aperture of the adjacent arm and having substantially point bearing contact.

5. A micrometer gauge comprising a frame element having spaced arms one of which has a spindle receiving opening, a spindle movable through the opening and having a threaded portion between the arms, a rotary sleeve between the arms and having a threaded interior engaging the threads of the spindle, means providing small localized and substantially point thrust bearing contact between the other arm and the adjacent end of the sleeve at the center of rotation of the latter, the other end of the sleeve and the first arm normally being substantially out of thrust bearing contact when the mentioned localized contact is in effect, and means normally preventing rotation of the spindle while allowing axial movement thereof, the parts being so constructed and related that upon rotation of the sleeve in one direction to advance the spindle, the resistance to advance thereof is such that the sleeve initially moves in the opposite direction so as to effect the localized bearing engagement after which advancing movement of the spindle occurs.

6. A micrometer gauge comprising a frame element having spaced arms provided with aligned openings, an internally threaded sleeve rotatable between the arms and having thrust bearing engagement at its end with the arms, a spindle projecting through the opening in one arm and into the sleeve and having an externally threaded, tubular end portion engaging the internal threads of the sleeve, the said end of the spindle terminating within the sleeve and being internally threaded and having its side wall axially slotted to render it expansible, a separate element projecting from the other end of the sleeve and having bearing engagement in the opening in the other arm, and means within the sleeve and threaded into the slotted end of the spindle for expanding the latter so as to take out play in the threaded engagement between the sleeve and spindle.

OLIVE M. LA VIGNE.
*Administratrix of the Estate of Joseph P. Lavigne, deceased*